(12) United States Patent
Schmitt

(10) Patent No.: US 12,328,036 B2
(45) Date of Patent: Jun. 10, 2025

(54) ELECTRIC MACHINE ROTOR

(71) Applicant: FORD GLOBAL TECHNOLOGIES, LLC, Dearborn, MI (US)

(72) Inventor: Matthew Schmitt, Southgate, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 220 days.

(21) Appl. No.: 17/893,900

(22) Filed: Aug. 23, 2022

(65) Prior Publication Data
US 2024/0072589 A1  Feb. 29, 2024

(51) Int. Cl.
*H02K 1/30* (2006.01)
*H02K 1/276* (2022.01)
*H02K 7/00* (2006.01)
*B60L 50/60* (2019.01)

(52) U.S. Cl.
CPC .............. *H02K 1/30* (2013.01); *H02K 1/276* (2013.01); *H02K 7/003* (2013.01); *B60L 50/60* (2019.02); *H02K 7/006* (2013.01)

(58) Field of Classification Search
CPC ........ H02K 1/276; H02K 1/2766; H02K 1/30; H02K 7/003; H02K 7/006
See application file for complete search history.

(56) References Cited

U.S. PATENT DOCUMENTS

| 6,177,749 | B1 | 1/2001 | Hussey et al. |
| 7,309,938 | B1 | 12/2007 | Smith |
| 10,989,297 | B2 | 4/2021 | Guarino |
| 2021/0399600 | A1* | 12/2021 | Hattori ..................... H02K 1/32 |
| 2023/0076200 | A1* | 3/2023 | Ness ..................... H02K 1/2766 |

* cited by examiner

*Primary Examiner* — Jue Zhang
(74) *Attorney, Agent, or Firm* — David B. Kelley; Brooks Kushman P.C.

(57) ABSTRACT

A rotor is disclosed for an eMachine of an electric vehicle. The rotor includes a plurality of laminations stacked together to form a motor core. The laminations define a plurality of shaft segment openings and a plurality of magnet retaining openings that are axially aligned, and extend parallel to an axis of rotation of the motor core. A plurality of shaft segments are received in the shaft segment openings that extend through the plurality of laminations. A first end and a second end of the shaft segments extend to opposite axial ends of the plurality of laminations that are stacked together to form the motor core. A first end cap and a second end cap are secured with fasteners to the first ends and the second ends of the shaft segments, respectively.

18 Claims, 4 Drawing Sheets

ELECTRIC MACHINE ROTOR

TECHNICAL FIELD

This disclosure relates to a rotor assembly for an electric machine.

BACKGROUND

Electric machines are provided for electric vehicles that power and recharge the batteries and are referred to as eMachines, or eMotors. Operational speed requirements and higher torque limits for electric vehicles are continuously being increased. The laminations making up the core of the motor (the section containing the magnets that generates a torque to drive the vehicle) on the shaft (the section interfacing the core to the rest of the driveline system) are retained with a locknut that sandwiches the laminations making up the core of the motor. This fixation structure is applicable for all operational speeds but is limited as to the amount of torque that the rotor shaft and laminations of the rotor can hold.

An alternative fixation method is to shrink fit the cores onto the shaft through differential heating to hold substantially higher torques. One drawback with shrink fitting is that for higher operational speeds, a larger temperature differential is required to increase the shrink fit during manufacturing as the expansion difference between the core and the shaft at speed increases exponentially as the max speed increases linearly based on the square of the angular velocity relationship of the rotor. This means that increasing a rotor's speed from 19,000 rpm to 20,000 rpm requires an exponentially greater temperature differential for shrink fitting than it does when increasing speed from 14,000 rpm to 15,000 rpm.

Further to the increased temperature requirements, there is a substantial expense for the equipment required for differential heating on a production line. There is a need for a rotor that can hold a high torque, does not require a temperature differential to manufacture, and prevents the core laminations from radially expanding off the shaft at high speeds.

This disclosure is directed to solving the above problems and other problems as summarized below.

SUMMARY

According to one aspect of this disclosure, an apparatus is disclosed that comprises a rotor for an eMotor. The apparatus includes laminations that receive shaft segments that are secured to the laminations with end caps. The laminations are stacked together to form a motor core. The motor core defines a plurality of shaft segment openings and a plurality of magnet openings that are axially aligned, and extend parallel to an axis of rotation of the motor core. The shaft segments are received in the shaft segment openings that extend through the plurality of laminations. A first end and a second end of the shaft segments extend to opposite axial ends of the plurality of laminations. The first end cap and second end cap are secured with fasteners to the first end and the second end of the shaft segments, respectively.

According to another aspect of this disclosure an apparatus is disclosed that comprises an eMotor. The eMotor includes a stator, a rotor, a plurality of laminations, a plurality of shaft segments, and a pair of end caps. The laminations are stacked together inside the stator. The rotor defines a plurality of shaft segment openings and a plurality of magnet openings that are axially aligned, and extend parallel to an axis of rotation of the rotor. The plurality of shaft segments are received in the shaft segment openings that extend through the plurality of laminations. A first end and a second end of the shaft segments extend to opposite axial ends of the plurality of laminations. The first end cap and second end cap are secured with fasteners to the first end and the second end of the shaft segments, respectively.

According to yet another aspect of this disclosure, a vehicle is disclosed that has an eMotor for providing traction that is powered by at least one battery, and recharges the at least one battery. The eMotor comprises a stator, a rotor core, a plurality of shaft segments, and first end cap and second end cap. The rotor core includes a plurality of laminations stacked inside the stator. The laminations define a plurality of axially aligned shaft segment openings and a plurality of axially aligned magnet openings that extend parallel to an axis of rotation of the rotor. The plurality of shaft segments are received in the shaft segment openings and extend through the laminations. A first end and a second end of the shaft segments extend to opposite axial ends of the plurality of laminations. The first end cap and second end cap are secured with fasteners to the first end and the second end of the shaft segments, respectively.

According to other optional or alternative aspects of this disclosure, the shaft segments are elongated in a direction of the axis of rotation of the motor core. The shaft segments are radially outwardly convex and are arcuate circumferentially transverse to the axis of rotation of the motor core. The first end cap and the second end cap receive the first ends and the second ends of the shaft segments, respectively. The first end and second end of the shaft segments define at least one opening in each end that receives the fasteners to hold the stack of laminations together. One of the end caps includes a plurality of splines on a driveshaft opening defined by the one of the end caps.

The above aspects of this disclosure and other aspects will be described below with reference to the attached drawings.

DETAILED DESCRIPTION

Figure 1:
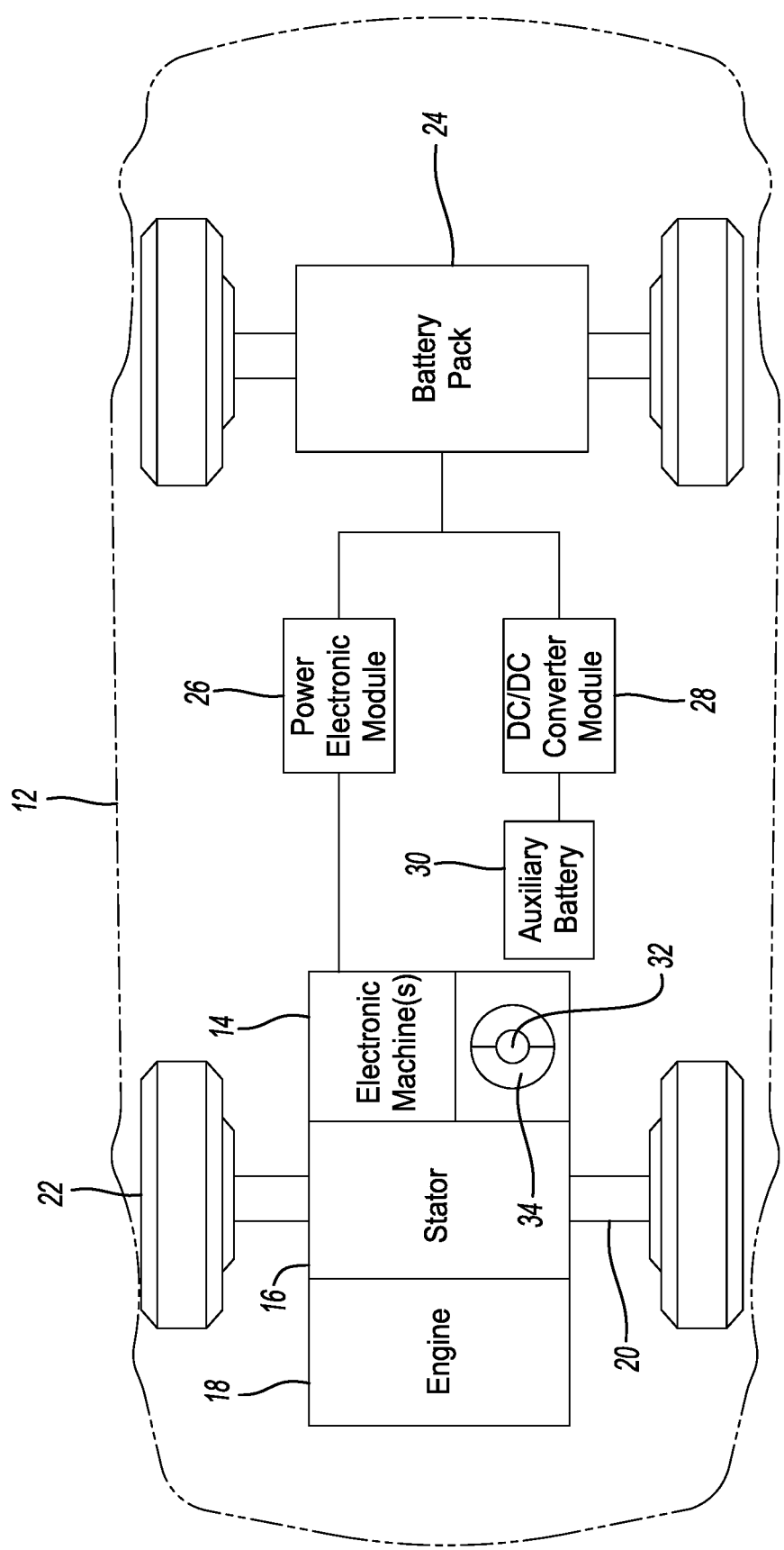
FIG. 1 is a schematic diagram of an example of a battery electric vehicle.

The illustrated embodiments are disclosed with reference to the drawings. However, it is to be understood that the disclosed embodiments are intended to be merely examples that may be embodied in various and alternative forms. The figures are not necessarily to scale, and some features may be exaggerated or minimized to show details of particular components. The specific structural and functional details disclosed are not to be interpreted as limiting, but as a representative basis for teaching one skilled in the art how to practice the disclosed concepts.

Various features illustrated and described with reference to any one of the figures may be combined with features illustrated in one or more of the other figures to produce embodiments that are not explicitly illustrated or described. The combinations of features illustrated provide representative embodiments for typical applications. Various combinations and modifications of the features consistent with the teachings of this disclosure could be used in particular applications or implementations.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof."

"As used herein, the term" if' is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event], "depending on the context."

FIG. 1 is a schematic drawing of one example of a plug-in hybrid-electric vehicle (PHEV). This disclosure is also applicable to plug-in electric vehicles and hybrid electric vehicles. A vehicle 12 may comprise one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a driveshaft 20 that is mechanically connected to the wheels 22. The electric machines 14 can provide propulsion and deceleration capability when the engine 18 is turned on or off. The electric machines 14 may also act as generators and can provide fuel economy benefits by recovering energy that would normally be lost as heat in the friction braking system. The electric machines 14 may also provide reduced pollutant emissions since the vehicle 12 may be operated in electric mode or hybrid mode under certain conditions to reduce overall fuel consumption of the vehicle 12.

A traction battery or battery pack 24 stores and provides energy that can be used by the electric machines 14 or other vehicle 12 components. The traction battery 24 typically provides a high voltage DC output from one or more battery cell arrays, sometimes referred to as battery cell stacks, within the traction battery 24. The high voltage DC output may also be converted to a low voltage DC output for applications such as vehicle stop/start. The battery cell arrays may include one or more battery cells. The traction battery 24 may be electrically connected to one or more power electronics modules 26 through one or more contactors (not shown). The one or more contactors isolate the traction battery 24 from other components when opened and connect the traction battery 24 to other components when closed. The power electronics module 26 is also electrically connected to the electric machines 14 and provides the ability to bi-directionally transfer electrical energy between the traction battery 24 and the electric machines 14. For example, a typical traction battery 24 may provide a DC voltage while the electric machines 14 may require a three-phase AC voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a pure electric vehicle or other hybrid vehicles. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., 12V battery). The eMachine 14 includes a rotor 32 and a stator 34.

Figure 2:
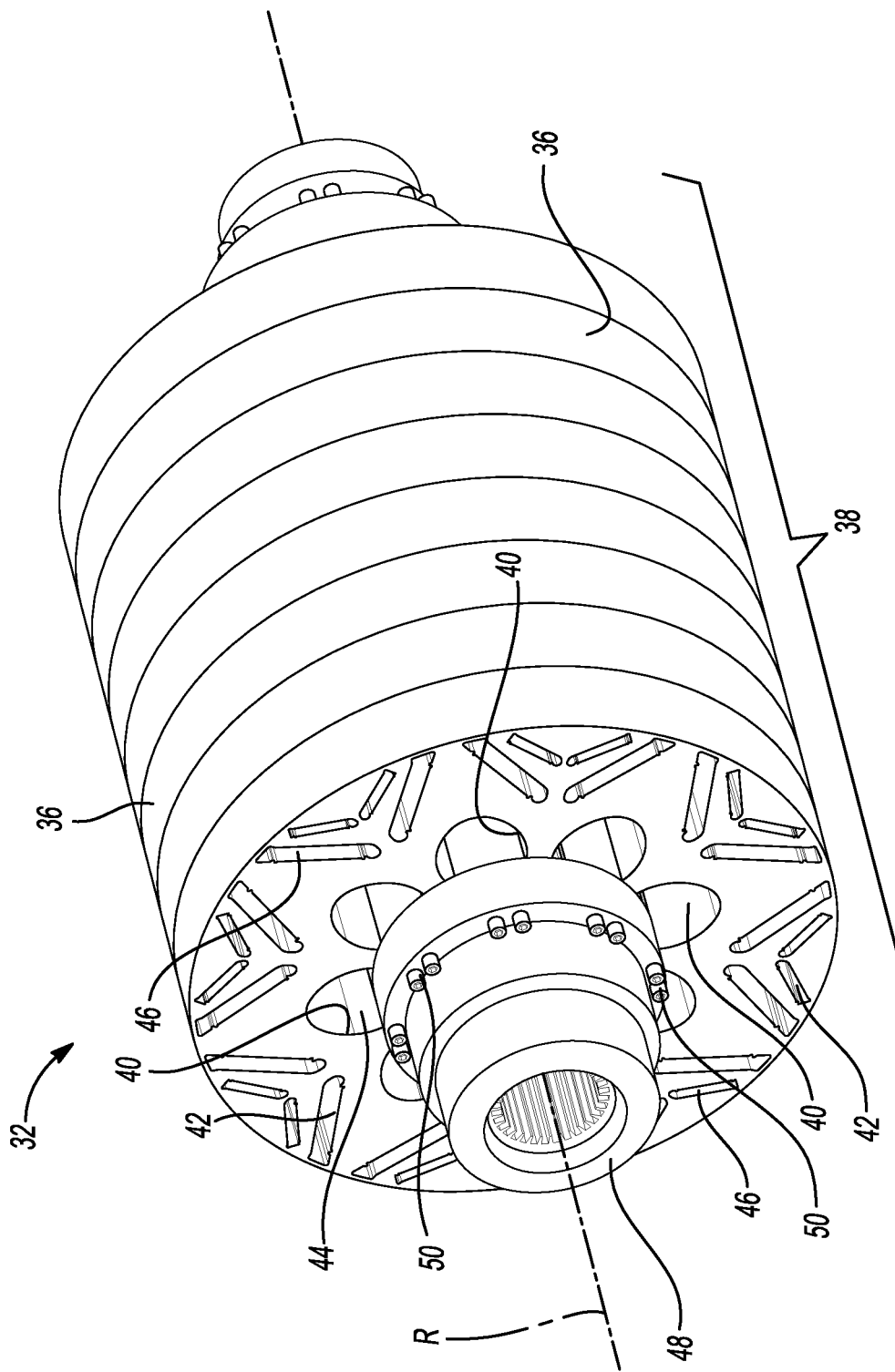
FIG. 2 is a perspective view of a rotor for an eMotor made according to one embodiment of this disclosure.

Referring to FIG. 2, the rotor 32 made according to one embodiment of this disclosure includes a plurality of laminations 36 made of steel that are stacked parallel to the direction of an axis of rotation R of the rotor 32. The stacked laminations 36 together form the eMotor core 38. A plurality of shaft segment openings 40 and a plurality of magnet retaining opening 42 are defined by the laminations 36. The shaft segment openings 40 are each adapted to receive a shaft segment 44. The magnet retaining openings 42 are each adapted to receive a magnet 46. A splined end cap 48 is attached to one end of the shaft segments 44 with fasteners 50.

Figure 3:
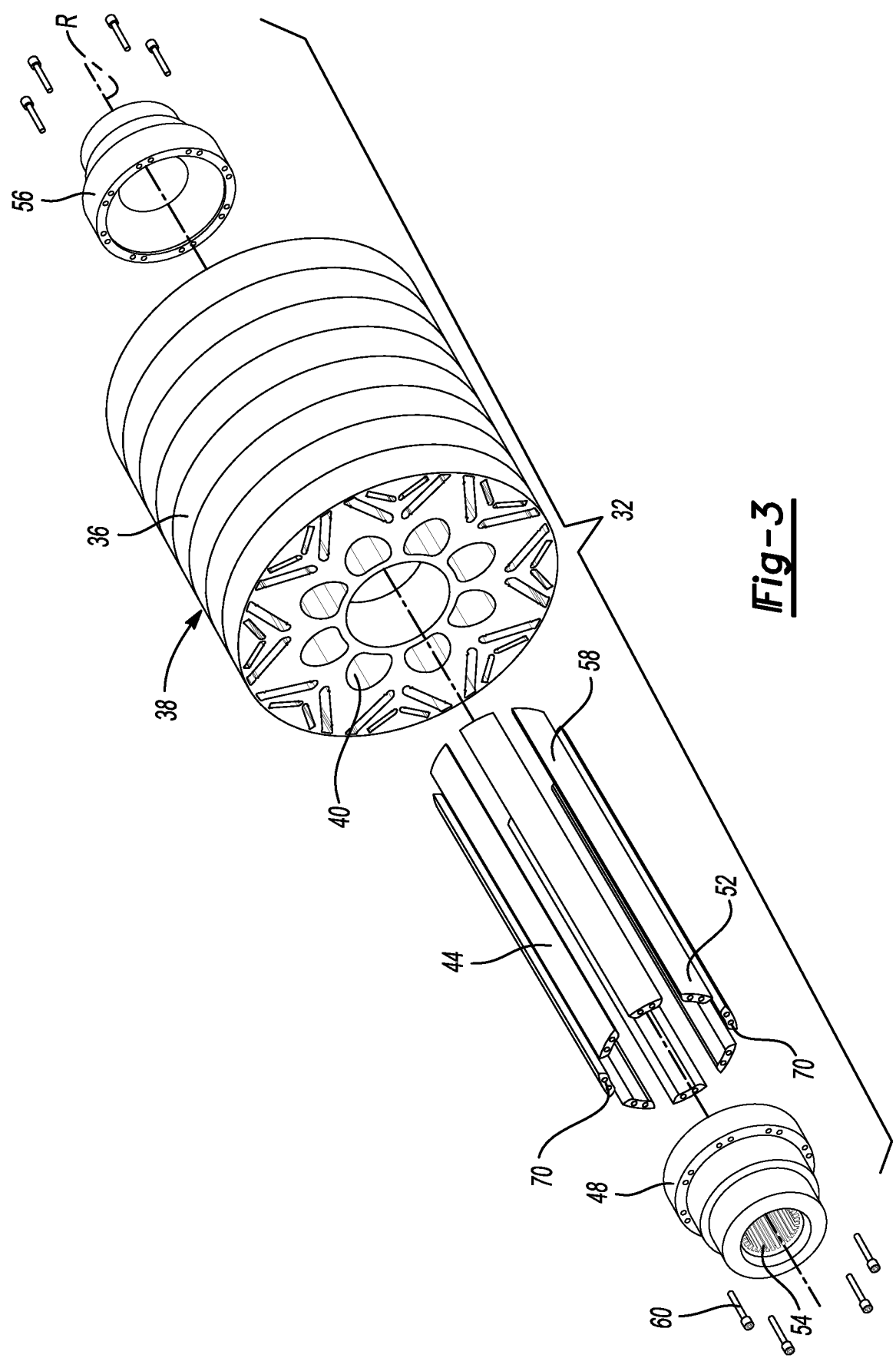
FIG. 3 is an exploded perspective eMotor rotor shown in FIG. 2.

Referring to FIG. 3, the component parts of the rotor 32 are shown in greater detail. The stack of laminations 36 is shown that form the motor core 38. Eight shaft segments 44 are shown to be aligned with the shaft segment openings 40. The splined end cap 48 is aligned with a first end 52 of the shaft segments 44. The splines 54 are provided on the inner diameter of the splined end cap 48 and function to connect the eMachine 14 to a driveshaft 20 (shown in FIG. 1). An end cap 56 is assembled to a second end 58 of the shaft segments 44. Fasteners 60 are received in openings defined by the end caps 48 and 56 secure the end caps 48 and 56 to the first and second ends 52 and 58, respectively.

The shaft segments 44 are arrayed around the axis of rotation R of the motor core 38. The shaft segments 44 extend in the direction of the axis of rotation R of the motor core 38. The shaft segments 44 are arcuate in a direction circumferentially transverse to the axis of rotation R of the motor core. The splined end cap 48 and the end cap 56 are adapted to receive the first end 52 and the second end 58 of the shaft segments 44, respectively. The first end 52 and the second end 58 define threaded openings 70 that receive the fasteners 60 when the rotor 32 is assembled.

Figure 4:
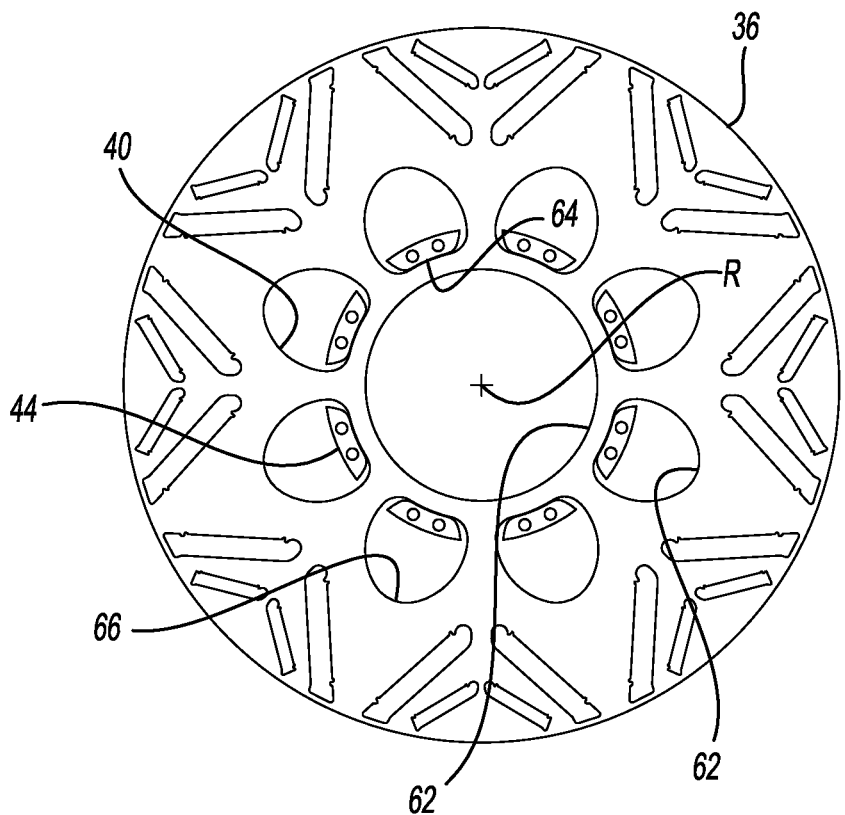
FIG. 4 is an end elevation view of the stacked laminations of the eMotor rotor shown in FIG. 2.

Referring to FIG. 4, one of the laminations 36 is shown to include a central opening 62. The plurality of equally spaced shaft segment openings 40 are arrayed about the central opening 62. The shaft segments 44 are arcuate in shape in the circumferential direction and are received on a convex arcuate portion 64 of the shaft segment openings 40. The outer portions 66 of the shaft segment openings 40 are partially cylindrical and connect to the outer edges of the radially outwardly convex arcuate portions 64. The shape of the shaft segment openings 40 may be fully cylindrical in one embodiment and, if so, the shaft segments 44 would be arcuately oriented but concave to follow the shape of the cylindrical shaft segment openings 40.

Figure 5:
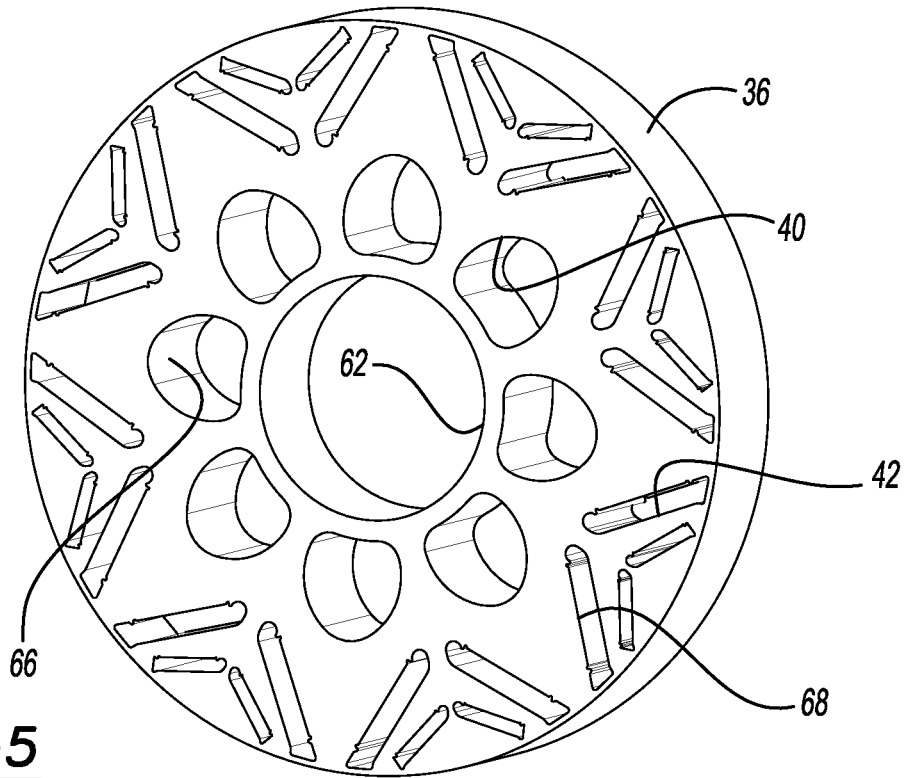
FIG. 5 is an end elevation view of the stacked laminations of the eMotor rotor with the segmented shaft disposed in openings defined by the stacked laminations shown in FIG. 2.

Referring to FIG. 5, one lamination 36 is shown with magnets 68 in the magnet retaining openings 42. The magnets 68 are held in the magnet retaining openings 42 at a selected angular orientation to maximize flux density. Other magnet arrangements can be incorporated if desired as is well known in the art of motor manufacturing.

Referring to FIGS. 4 and 5, the plurality of shaft segment openings and the plurality of magnet openings are axially aligned, and extend parallel to an axis of rotation R of the motor core.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and includes modifications of the illustrated embodiments. In addition, the features of various implementing embodiments may be combined to form further embodiments of the invention.

What is claimed is:

1. An apparatus, comprising:
   a plurality of laminations stacked together to form a motor core, wherein the laminations define a plurality of arcuate shaft segment openings having a convex arcuate portion and a plurality of magnet openings that are axially aligned, and extend parallel to an axis of rotation of the motor core;
   a plurality of arcuate shaft segments having a concave surface received on the convex arcuate portion of the arcuate shaft segment openings that extend through the plurality of laminations, wherein a first end and a second end of the arcuate shaft segments extend to opposite axial ends of the plurality of laminations stacked together to form the motor core; and
   a first end cap and second end cap secured to the first end and the second end of the arcuate shaft segments, respectively, with fasteners.

2. The apparatus of claim 1 wherein the arcuate shaft segments are elongated in a direction of the axis of rotation of the motor core.

3. The apparatus of claim 1 wherein the arcuate shaft segments are arcuate circumferentially transverse to the axis of rotation of the motor core.

4. The apparatus of claim 1 wherein the arcuate shaft segments are arrayed around the axis of rotation of the motor core and extend in a direction of the axis of rotation of the motor core, wherein the arcuate shaft segments are arcuate circumferentially transverse to the axis of rotation of the motor core, wherein the first end cap and the second end cap receive the first end and the second end of the arcuate shaft segments, respectively.

5. The apparatus of claim 4 wherein the first end and second end of the arcuate shaft segments define at least one opening in each end that receives the fasteners to hold the stack of laminations together.

6. The apparatus of claim 1 wherein one of the end caps includes a plurality of splines on a central opening defined by the one of the end caps.

7. An apparatus, comprising:
   a stator;
   a rotor including a plurality of laminations stacked together inside the stator, the rotor defines a plurality of arcuate shaft segment openings having a convex arcuate portion and a plurality of magnet openings that are axially aligned, and extend parallel to an axis of rotation of the rotor;
   a plurality of arcuate shaft segments having a concave surface received on the convex arcuate portion of the arcuate shaft segment openings that extend through the plurality of laminations, wherein a first end and a second end of the arcuate shaft segments extend to opposite axial ends of the plurality of laminations stacked together to form the rotor; and
   a first end cap and second end cap secured to the first end and the second end of the arcuate shaft segments, respectively, with fasteners.

8. The apparatus of claim 7 wherein the arcuate shaft segments are elongated in the direction of the axis of rotation of the rotor.

9. The apparatus of claim 7 wherein the arcuate shaft segments are arcuate circumferentially transverse to the axis of rotation of the rotor.

10. The apparatus of claim 7 wherein the arcuate shaft segments are arrayed around the axis of rotation of the rotor and extend in a direction parallel to the axis of rotation the rotor, wherein the arcuate shaft segments are arcuate circumferentially transverse to the axis of rotation of the rotor, wherein the first end cap and the second end cap receive the first end of the arcuate shaft segment and the second end of the arcuate shaft segments, respectively.

11. The apparatus of claim 10 wherein the first end and the second end of the arcuate shaft segments define at least one opening in each end that receives the fasteners to hold the plurality of laminations together.

12. The apparatus of claim 7 wherein one of the first end cap and the second end cap includes a plurality of splines on a central opening defined by the one of the end caps.

13. A vehicle having an eMotor that provides traction from at least one battery, and recharges the at least one battery, the eMotor comprising:
   a stator;
   a rotor core including a plurality of laminations stacked inside the stator, the rotor core defines a plurality of arcuate shaft segment openings having a convex portion and a plurality of magnet openings that are axially aligned, and extend parallel to an axis of rotation of the rotor;

a plurality of arcuate shaft segments having a concave portion received in the arcuate shaft segment openings that extend through the plurality of laminations, wherein a first end and a second end of the arcuate shaft segments extend to opposite axial ends of the plurality of laminations stacked together to form a motor core; and a first end cap and second end cap secured with fasteners to the first end and the second end of the arcuate shaft segments, respectively.

14. The vehicle of claim 13 wherein the arcuate shaft segments are elongated in a direction of the axis of rotation of the rotor.

15. The vehicle of claim 13 wherein the arcuate shaft segments have a radially outwardly convex arcuate portion and circumferentially transverse to the axis of rotation of the rotor.

16. The vehicle of claim 13 wherein the arcuate shaft segments are arrayed around the axis of rotation of the rotor and extend in the direction of the axis of rotation of the rotor, wherein the arcuate shaft segments are arcuate circumferentially transverse to the axis of rotation of the rotor, wherein the end caps receive the ends of the arcuate shaft segments.

17. The vehicle of claim 16 wherein the ends of the arcuate shaft segments define at least one opening in each end that receives the fasteners to hold the stack of laminations together.

18. The vehicle of claim 13 wherein one of the end caps includes a plurality of splines on a central opening defined by the one of the end caps.

* * * * *